United States Patent [19]

Ankenman

[11] 4,210,210
[45] Jul. 1, 1980

[54] QUICK MOUNTING MECHANISM FOR AGRICULTURAL IMPLEMENT

[76] Inventor: Dale E. Ankenman, Rte. 1, Almena, Kans. 67622

[21] Appl. No.: 897,114

[22] Filed: Apr. 17, 1978

[51] Int. Cl.$^2$ .............. A01B 63/26; A01B 37/00
[52] U.S. Cl. .................. 172/272; 172/676; 172/494; 172/500; 172/705
[58] Field of Search ............. 172/676, 707, 705, 708, 172/710, 134, 300, 301, 302, 303, 677, 265, 266, 267, 268, 753, 749, 272, 274, 494, 500, 506

[56] References Cited

U.S. PATENT DOCUMENTS

| | | | |
|---|---|---|---|
| 1,332,643 | 3/1920 | Thomas | 172/676 |
| 1,886,438 | 11/1932 | Weeks | 172/676 |
| 1,917,944 | 7/1933 | Langdon | 172/676 |
| 2,134,438 | 10/1938 | Click | 172/676 |
| 2,136,640 | 11/1938 | Smith | 172/303 X |
| 2,176,326 | 10/1939 | Brown | 172/272 |
| 3,098,529 | 7/1963 | Wade | 172/710 |
| 3,258,076 | 6/1966 | Groenke | 172/710 |
| 3,493,055 | 2/1970 | Van Peursem | 172/708 |

*Primary Examiner*—Richard J. Johnson
*Attorney, Agent, or Firm*—Fishburn, Gold and Litman

[57] ABSTRACT

A mechanism for quickly and independently mounting detachable soil engaging tools on mobile agriculture equipment includes a vertically extending frame member and a pivotal tool support member. The frame member and tool support member have a tool mounted orientation, during which a frame member surface abuts a tool member surface in facing relationship where they are rigidly held and locked together by a hooking and locking assembly. The hooking and locking assembly have parts thereof aligned and respectively positioned so as to permit operable engagement by a simple insertion motion.

11 Claims, 7 Drawing Figures

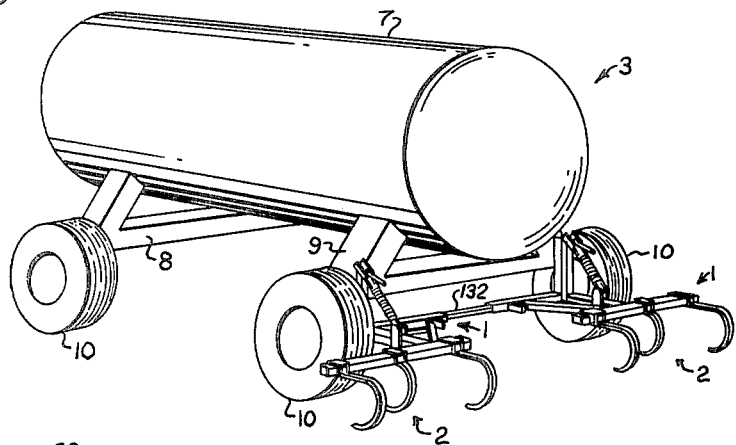
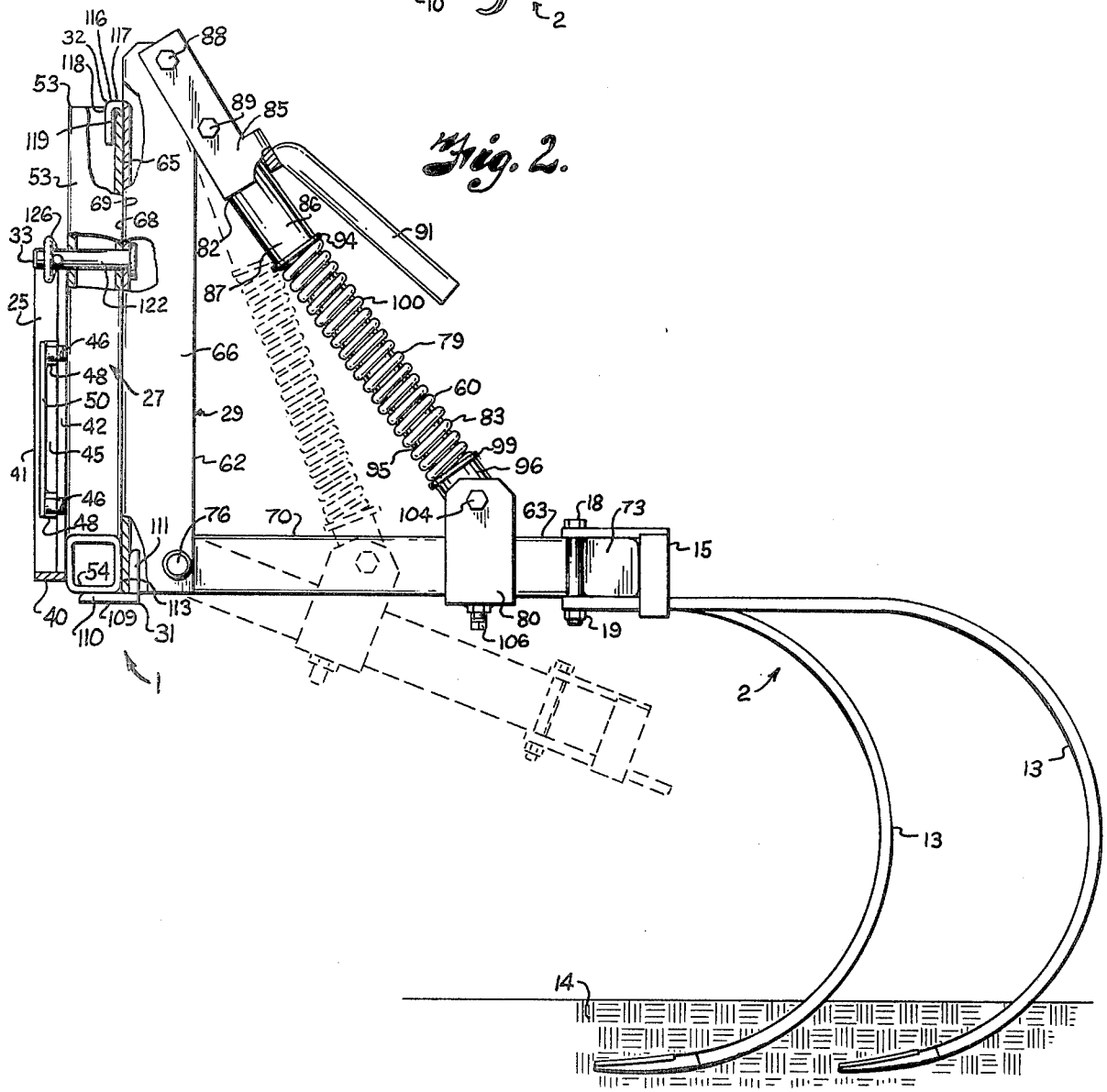

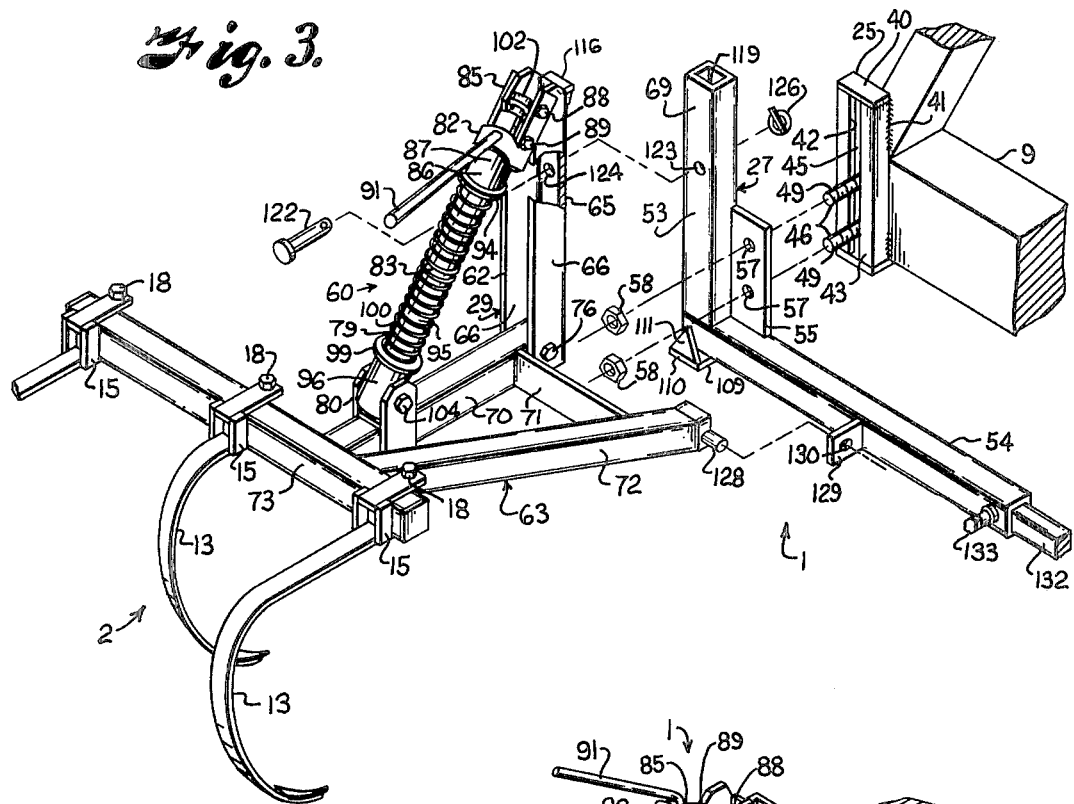
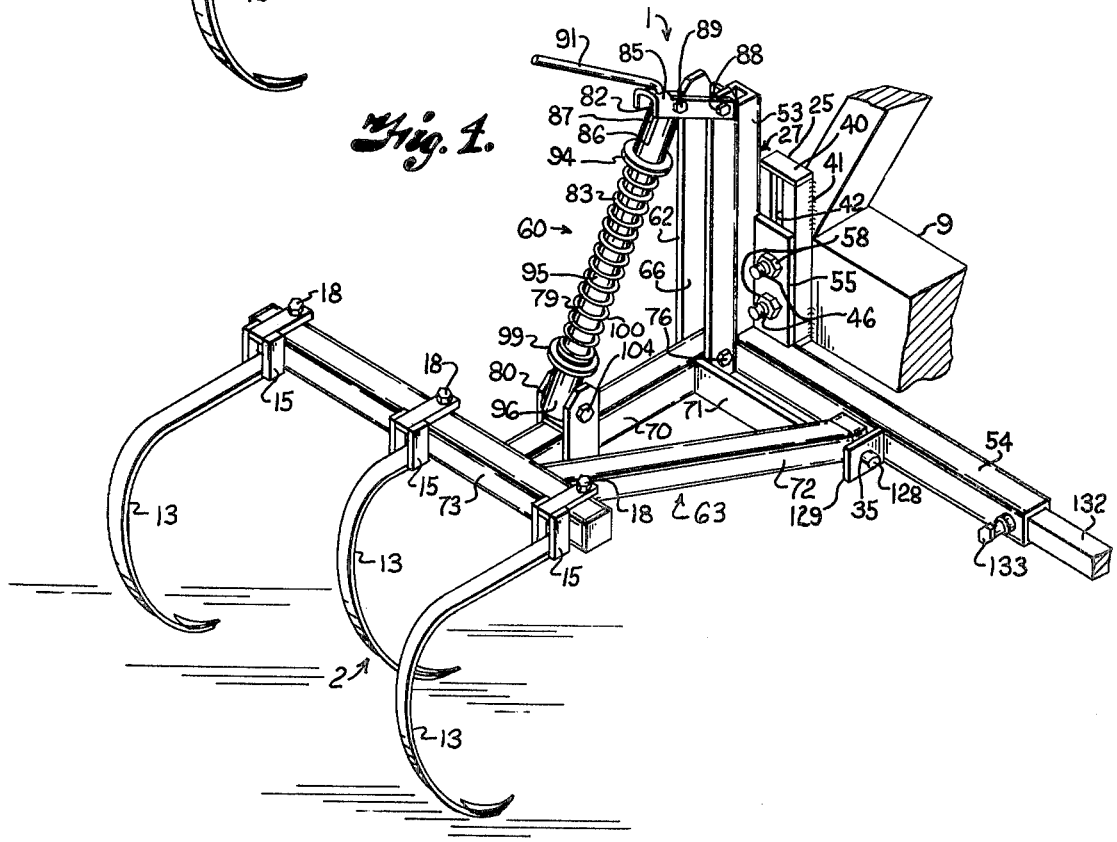

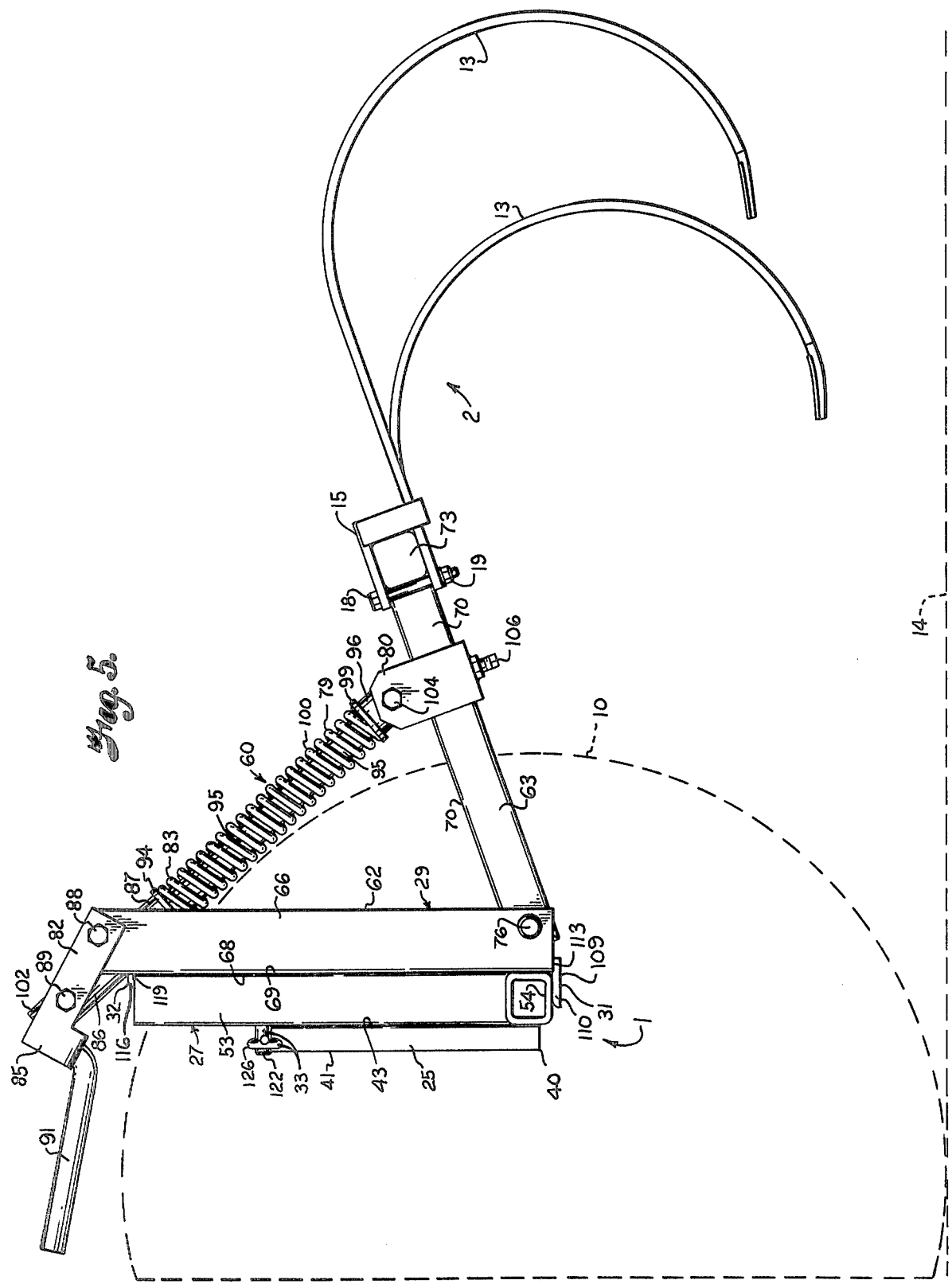

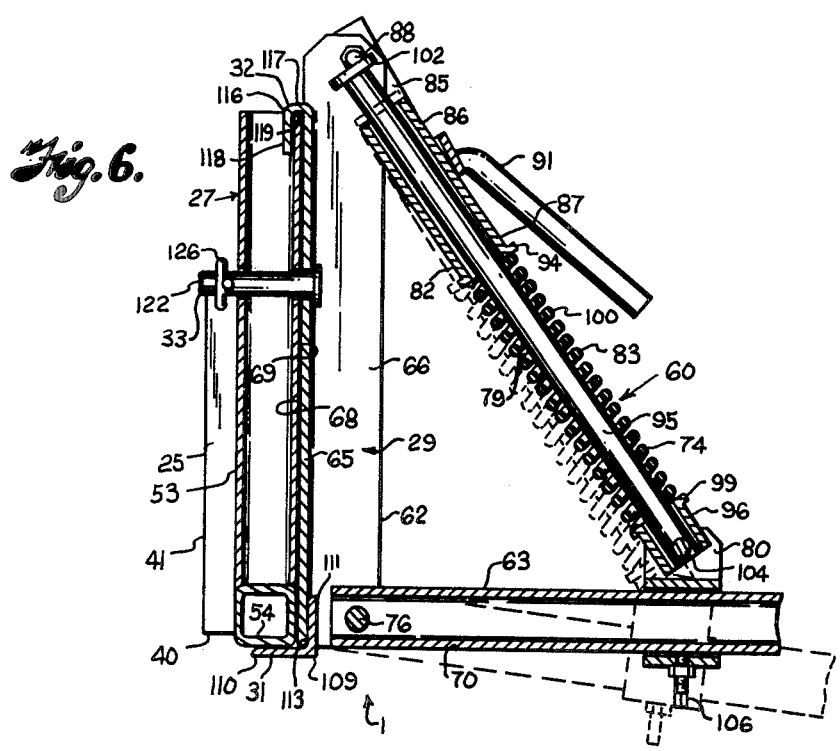

QUICK MOUNTING MECHANISM FOR AGRICULTURAL IMPLEMENT

BACKGROUND OF THE INVENTION

This invention relates to a mechanism for connecting agriculture tools to mobile agriculture equipment, and more particularly to a mechanism which allows independent quick mounting and quick detaching of such tools.

Modern farmers, in order to economize on various agricultural operations, are today doing several of these operations in a single pass across a field by trailing compound or multiple devices behind a single tractor. For instance, tillage and fertilizing operations may be accomplished simultaneously in this manner. In order to further economize, many farmers are trailing large fertilizer nurse tanks behind a fertilizer injector rather than individually filling carried, spaced fertilizer tanks. This trailing nurse tank is usually heavy and tends to produce wide deep tracks in the just worked field, leaving the ground hard-packed and vulnerable to water erosion and weed growth. Thus, it is important to provide a device to remove these tracks. In this regard see also my copending application entitled BIASED AGRICULTURAL IMPLEMENT, Serial No. 897,030, filed Apr. 17, 1978. Because a number of different nurse tanks may be used during a single day, such a track removal device is preferably easily and quickly transferable from one nurse tank to another. Thus each tool or tool gang should be self contained and be attachable to and removable from by one simple quick movement, preferably requiring only one farmer-operator. It is also important that such a track removal device be easily adjustable because various field conditions call for different tool depth and tool spacing settings, and such adjustability should not interfere with the transferability thereof to other nurse tanks. In this regard, the track removal device ideally should be independently mounted behind each rear tire in order to better follow the contour of the ground and render the device light enough for easy handling. Still, further, the tools on such a track removal device should not be fixed in position in vertical adjusted relationship to the ground, as rocks and other obstructions are frequently encountered which would otherwise cause breakage and/or put excessive strain upon the equipment behind which the device is trailing. Although it is necessary not to have the track removal device fixed in relationship to the ground, yet it should be biased theretoward, to reassume, after striking an obstruction, a selected depth in the soil being worked.

SUMMARY OF THE INVENTION

The present invention involves the use of a first member and a second member, the first member being attached to an agriculture tool and the second member being connected to mobile agriculture equipment, which members are positioned in a facing orientation when the tool is in a mounted position. The facing orientation is maintained by hooking assembly which incorporates pivotal freedom for the tool and a locking assembly. The parts of the hooking assembly are aligned such that they may be engaged with one another in one simple insertion movement, thus positioning the tool in a mounted position. The locking assembly, which may be in the form of a pin and receivers, locks the first and second members together against a relative movement which would diverge the hooking assembly.

The principal objects of the present invention are: to provide a quick mounting mechanism for mounting a detachable tool or gang of tools on mobile agriculture equipment; to provide such a mechanism which allows independent mounting of the tool or gang of tools behind mobile agriculture equipment; to provide such a mechanism which intercooperates with a tool, leveling and biasing for controlling the working depth of the tool apparatus and downward biasing the tool or gang of tools, whereby the tool is engaged in the soil to a selected depth but will pivot upwardly when striking an obstruction; to provide such a mechanism having two principal members which are easily and quickly connected to or detached from each other; to provide such a mechanism having a hooking assembly which cooperates in the connection of the two principal members thereof; to provide such a mechanism having a locking assembly which in cooperation with the hooking assembly, secures the two principal members thereof together when in a tool mounting position; to provide such a mechanism having a pivoting assembly which cooperates with the tool leveling biasing apparatus to allow the tool to be pivotally rotated about a horizontal axis; to provide such a mechanism which is simple and easy to operate, yet provides a strong stable base for the tool or gang of tools to provide such a mechanism allowing easy transfer of the tool or gang of tools from one piece of agriculture equipment to another; and to provide such an mechanism which is capable of an extended useful life and is particularly well adapted for the proposal use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a mobile tank vehicle having soil working tools trailing therebehind and connected thereto by a quick connect mounting mechanism embodying the present invention.

FIG. 2 is an enlarged side elevational view of the quick mounting mechanism having a tool leveling and biasing apparatus and soil working tools connected thereto with portions thereof broken away, and showing depth adjustment of the soil working tools in phantom.

FIG. 3 is a partially exploded perspective view of the quick mounting mechanism having the tool leveling and biasing apparatus and the soil working tools attached thereto, showing attachment thereof to a frame of the mobile tank vehicle.

FIG. 4 is a perspective view of the quick mounting mechanism, the tool leveling and biasing apparatus and soil working tools shown in FIG. 3, with the soil working tools in a partially raised position.

FIG. 5 is a side elevational view of the quick connect mounting mechanism, the tool leveling and biasing apparatus and the soil working tools connected thereto locked in a soil disengaged position, also showing the wheel of the mobile tank vehicle in phantom.

FIG. 6 is a side elevational view of the quick connect mounting mechanism and the tool leveling and biasing apparatus with portions thereof broken away, shown locked in a soil engaging position and also showing, in phantom, the pivotal and biasing movement of a trailing arm and an extensile arm of the mounting apparatus.

FIG. 7 is a fragmentary rear elevational view of the quick mounting mechanism and the tool leveling and biasing apparatus locked in the soil engaging position.

DETAILED DESCRIPTION OF THE PREFERRED EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In the illustrated embodiment of the present invention shown in the drawings, the reference numeral 1 generally designates a quick mounting mechanism according to the present invention, for independently mounting a detachable tool 2 on mobile agricultural equipment 3.

For purposes of description the term "front" means toward the left, as seen in FIG. 2, and "rear" means the opposite direction.

The mobile agricultural equipment or vehicle 3 particularly contemplates devices which leave deep indentations or tracks in freshly worked soil and/or trails agricultural tools therebehind. The agricultural equipment 3 in the illustrated embodiment, as is best shown in FIG. 1, comprises a fertilizer tank 7 supported on a front wheeled frame structure 8 and a rear wheeled frame structure 9 associated respectively with supporting wheels 10 rotatably attached thereto.

The tool 2 may be any suitable device for working the soil, particularly including but not limited to a device having spring teeth, and the term "tool" as used herein also includes a group of individual tools arranged in a gang. In the illustrated embodiment as seen in FIG. 2, the tool 2 comprises a plurality of spaced apart spring teeth 13 which engage the soil 14 and which have clamps 15 attached thereto for securing the teeth 13 to the mounting apparatus 1. Each of the clamps 15 are secured in a desired transverse position on the apparatus 1 by a bolt 18 having a fastener 19. The tool 2 has a tool mounted orientation or position, wherein the tool 2 is connected to the vehicle 3, and a tool detached position which will be discussed in greater detail hereinafter.

The quick mounting mechanism 1 comprises a frame member, tool support member, at least one hooking assembly and at least one locking assembly and may include a securing means and a pivoting assembly. The quick mounting mechanism 1 of the illustrated embodiment comprises a securing means 25, a frame member 27, a tool support member 29, two hooking assemblies 31 and 32, a locking assembly 33, and a pivoting assembly 35.

The securing means 25 may be any means or device suitable for attaching the frame member 27 to the vehicle 3, and, for instance, could be bolts, clamps, or simply the welding of the frame member 25 to the vehicle 3. In the illustrated embodiment, as is best seen in FIGS. 2 and 3, the securing means 25 comprises a plate-like device 40 welded along the functional edges 41 thereof to the vehicle rear frame structure 9 and having a vertically extending slot 42 in an rearward surface 43 thereof. The slot 42 opens interiorly of the plate-like device 40 to define a T-shaped channel 45 therein, as is best seen in FIG. 2. A pair of bolts 46 are positioned in the channel 45, such that heads 48 of the bolts 46 are held therein due to the narrow width of the slot 42 and threaded ends 49 of the bolts 46 extend outwardly therefrom in a generally rearward and horizontal attitude. The bolt heads 48 are fixedly fastened to a joining member 50 extending thereinbetween. The joining member 50 prevents rotation and maintains equal spacing between the bolts 46. The bolts 46 are in this manner free to move vertically into various positions along the slot 42.

The frame member 27 comprises a device suitable for connecting with the vehicle 3 and the tool support member 29, as will be discussed hereinafter, particularly vertically oriented stable structure. In the illustrated embodiment, the frame member 27 is basically an L-shaped structure comprising an upward arm 53, a horizontal arm 54, and a connecting plate 55. The upward arm 53 is a vertically extending rectangular tube joined at a lower terminal end thereof to one end of the horizontal arm 54. The horizontal arm 54 is also a rectangular tube having a generally horizontal and transverse attitude. The connecting plate 55 is vertically oriented and fixedly attached to the upward arm 53 and the horizontal arm 54 beginning at the junction thereof and extending along the edges thereof. The connecting plate 55 also has a vertically aligned pair of openings 57 of diameter suitable for receiving the threaded ends 49 therein respectively and being equally spaced apart as the bolts 46. In normal deployment of the frame member 27 the bolts 46 are positioned through the openings 57 respectively and secured thereto by fasteners 58, as shown in FIG. 4, when the tool 2 is in the tool mounted position. While a particular frame member 27 has been described hereinabove, it can readily be seen that other structures or combination of structures such as a single rectangular plate could be equivalently substituted for the L-shape structure so described. Additional features of the frame member 27 will be discussed hereinafter.

The tool support member 29 is a device suitable for connecting to the frame member 27 and for attachment of the tool 2 thereto, especially such a device which allows the tools 2 to pivot about a transverse horizontal axis. In the illustrated embodiment the frame member 27 comprises a vertical arm 62 and a rearward frame 63 and has included thereon a tool leveling and biasing apparatus or implement 60.

The vertical arm 62 has a front 65 and a pair of somewhat longer sides 66 attached along edges thereof to form a U-shaped structure open at each end thereof. The vertical arm front 65 has a forward facing surface 68 which abuts a rearward facing surface 69 on the frame member 27 when the tool 2 is in the tool mounted position.

The rearward frame 63 comprises a rearward arm 70, a bracing arm 71, a diagonal arm 72, and a tool bar 73. The rearward arm 70 and the bracing arm 71 generally define sides of a triangle and the diagonal arm 72 the hypotenuse thereof, thus forming a stable structure. The tool bar 73 is attached to a rearward end of both the rearward arm 70 and the diagonal arm 76 and has a generally transverse and horizontal attitude. The teeth 13 are adjustably attached to the tool bar 73 by the clamps 15 at selected positions therealong. The rearward arm 70 is pivotally connected near a frontward end thereof to a lower end of the vertical arm 62 by a first pivoting pin 76.

The tool leveling and biasing apparatus or implement 60 comprises an extensile arm 79 pivotally connected to a lower terminal sleeve number 80. The extensile arm 79 has an upper portion 82 and a lower portion 83. The upper portion has a first section 85 and a second section 86. The first section 85 is pivotally connected near one end thereof by a pair of pivoting pins 88 to an upper end of the vertical arm 62 and near the other end thereof by a pair of hinge pins 89 to the second section 86. The first section 85 also has a handle 91 attached thereto and outwardly extending therefrom. The second section 86 comprises a first tubular sleeve 87 having a lip 94 radially extending from a lower end thereof. The second section 86 also has a pair of receivers 92 attached thereto and extending outwardly therefrom to receive the hinge pins 89 attached thereto and extending outwardly therefrom to receive the hinge pins 89 respectively. The first section 85 and the second section 86 are pivotally connected by the hinge pins 89, having a side by side position and an elongate position. The extensile arm lower portion 83 comprises an elongate cylindrical member 95 having mounted thereon at a lower end thereof a second tubular sleeve 96 with a lip 99 radially extending from an upper end of the sleeve 96 and an elongate compression spring 100 sleeved on the cylindrical member 95. The spring 100 thrusts against both of the lips 94 and 99 in opposite directions. The cylindrical member 95 also has a stop 102 radially extending from the upper end thereof. The upper portion lower section sleeve 87 is slidably mounted on the cylindrical member 95 below the stop 102. The lower portion 83 is pivotally attached to the sleeve member 80 by a third pivot pin 104. The sleeve member 80 encircles and is slidably mounted on the rearward arm 70. A set screw 106 on the bottom of the sleeve member 80 has a locked position wherein the screw 106 is forcibly biased against the rearward arm 70 and an unlocked position wherein the screw 106 does not engage the rearward arm 70. The extensile arm upper section 85, lower section 86, hinge pins 89 and pivoting pins 88 in conjunction with the spring 100 form an over-center locking mechanism having two fully opposed locking positions such that in the first locking position the tool 2 is in a ground engaged position and in the second locking position the tool 2 is in a ground disengaged position.

The first hooking assembly 31 and the second hooking assembly 32 each comprise a first hooking part and a second hooking part. In the illustrated embodiment, as best seen in FIGS. 2 and 3, the first hooking assembly first hooking part is a hook 109 having a relatively short, rearwardly and horizontally extending rectangular segment 110 with one end thereof attached to the frame member horizontal arm 54 and a second end thereof attached to a vertically upstanding triangular segment 111. The first hooking assembly second hooking part comprises a hook receiver 113 being the lower open end of the vertical arm 62, as is illustrated in FIG. 2, adapted for receiving the triangular segment 111 therein and having an interior width substantially equal to the width of the base of the triangular segment 111. The second hooking assembly 32 comprises a hook 116 similar in shape to hook 109 having rectangular segment 117 and triangular segment 118 and a hook receiver 119 being the upper open terminal end of the upward arm 53. The hook 116 is attached by one end of the rectangular segment 117 to an upper end of the vertical arm front 65, extending frontwardly therefrom. The second hook assembly triangular segment 117 points in a downwardly or opposite direction to the first hook assembly triangular segment 111. The hook 109 and the hook receiver 119 are spaced apart a distance equal to the distance between the hook 116 and the hook receiver 111. While certain hooking part arrangements have been disclosed herein, it shall be apparent that other types of hooks and hook receivers, combinations of hooking assemblies, and positionings thereof would be functionally equivalent to those shown herein.

The locking assembly 33 has a first locking portion and a plurality of second locking portions. In the illustrated embodiment, as best seen in FIG. 3, the first locking portion is an elongate pin 122. The second locking portions comprise a first pin receiver 123 being a generally horizontal and front-to-rearwardly extending opening in the upward arm 53 and the second pin receiver 124 being also a generally horizontal front-to-rearwardly extending opening in the vertical arm 62. The first pin receiver 123 is spaced apart from the hook receiver 119 a distance equal to the distance between the second pin receiver 124 and the hook 116. Likewise the first pin receiver 123 is spaced apart from the hook 109 a distance equal to the distance between the second pin receiver 124 and the hook receiver 113. Thus when the tool 2 is in the tool mounted position, the hook 109 is engaged in hook receiver 113, the hook 116 is engaged in the hook receiver 119, and the locking pin receiver 123 is coaxially aligned with the locking pin receiver 124, such that the pin 122 may be inserted therethrough and thus be in locking position. A fastener 126 holds the pin in locking position.

The pivoting assembly 35 has a first section and a second section and may be any suitable devices such as a pin and socket arrangement. In the illustrated embodiment, as best seen in FIG. 3, the pivoting assembly first section is a pin 128 having a generally horizontal and transverse attitude and being attached to and extending from near the front end of the diagonal arm 72. The second section is a tab 129 attached to and rearwardly extending from the horizontal arm 54 and having a pin receiver or opening 130 therein suitable for receiving and pivoting therein the pin 128. The tab 129 and the pin 128 are spaced apart from the hooking assembly 31 and the locking assembly 33 equal distances such that when the tool 2 is in tool mounted position, as was discussed above, the pin 128 is engaged in the opening 130. The pin 128 is coaxially aligned with the pivoting pin 76 such that the rearward frame 63 may pivot about a generally transversely and horizontally extending axis on the pins 128 and 76. It is apparent that other types of pivoting assemblies would be functionally equivalent to that described.

The frame member 27 of several quick mounting connection mechanisms 1 may be interconnected without interferring with the independent mounting of the tool 2, as is shown in FIG. 1, by a connecting means. The connecting means illustrated comprises a rectangular elongate rod 132 having cross-sectional dimensions substantially equal to the interior dimensions of each of the horizontal arms 54, such that the rod 132 may be slidably engaged into at least two coaxially aligned horizontal arms 54. The rod 132 is held in an engaged position in the horizontal arms by a set screw 133.

In utilizing the quick mounting construction as above described, frame member 27 is first attached to the vehicle 3. In the illustrated embodiment, a securing means platelike device 40 is fixedly attached, as by welding, to each point or position on the vehicle 3 whereat it is desirous to independently mount the tool 2. The frame member 27 is then positioned such that each of the openings 57 on the plate device 55 receives one of the bolts 46, as is shown in FIG. 4. The bolts 46 are then slid vertically within the channel 45 until the frame member 27 is at a desired height position, this height position grossly determining the depth of the tool 2 when engaging the soil 14. Each of the fasteners 58 is then mounted on one of the threaded ends 49 respectively and tightened thereon, such that the frame member 27 is securely locked in the desired height position relative to the vehicle 3. In normal use the frame member 27 is thereby permanently attached to the vehicle 3 until such time as a height adjustment is required and/or use of the tool 2 behind the vehicle 3 is permanently discontinued.

The tool support member 29 having been previously fully assembled as described above, has the tool 2 attached thereto. The tool 2 may comprise one tool or the tool gang, as is shown in the illustrated embodiment, comprising a plurality of spring teeth 13. The teeth 13 are adjusted on the tool bar 73 at selected densities and intervals therebetween to correspond to the width of the soil 14 to be worked thereby, determined normally by the width of the wheels 10 on the vehicle 3, and soil 14 characteristics such as compactibility thereof.

Having attached the frame member 27 to the vehicle 3 and prepared the tool support member 29 by attaching the tool 2 thereto, the quick mounting mechanism 1, according to this invention, is now ready for use. To place the tool 2 in the tool mounted position or orientation, wherein the frame member surface 69 is in facing relationship to the tool member surface 68, the tool support member 29 is in one simple and continuous insertion motion positioned, such that simultaneously the hook 109 engages the hook receiver 113, the hook 116 engages the hook receiver 119, and the pivoting pin 128 engages the pin receiver 130. The locking pin receivers 123 and 124 are now aligned, when the frame member 27 and the tool support member 29 are in the tool mounted position, and the locking pin 122 is inserted therethrough and secured therein by the fastener 126. The hooking assemblies 31 and 32 and the pivoting assembly 33 prevent any movement or rotation about the locking pin 122, thus the frame member 27 and the tool support member are firmly and securely locked together, and fixed in position relative to each other.

The quick mounting mechanism provides fast removal of the tool support member 29 having a tool 2 attached thereto from a vehicle 3 by just pulling the locking pin 122 and lifting in a generally upward direction. The tool support member is then immediately ready for re-connection to a second vehicle 3 having a frame member 27 mounted thereon. Normally the frame member 27 is not switched between two vehicles but this is not precluded should some reason arise for so doing. This changeover process is especially appropriate for fertilizer nurse tanks which are frequently changed during a fertilizing operation and the ease and speed of the changeover saves the farmer-operator energy and time.

In use behind a vehicle 3 of the tool 2 mounted by the quick mounting mechanism 1, the tool leveling and biasing apparatus 60 allows five adjustments of the depth of the tool 2 in the soil 14 by sliding the sleeve member 80 frontwardly or rearwardly along the rearward arm 70, thus pivoting the rearward frame 63 and the tool 2 downward and upward respectively as shown in FIG. 2. The extensile arm 79 provides a downward biasing pressure to the tool 2 whereby the tool may raise over obstructions, radially pivoting about the horizontal axis passing through the pivot pins 76 and 128, in the soil 14 but is biased to return to the selected depth therein by the action of the spring 100. The extensile arm first section 85 and second section 86 along with the hinge pins 89 and the pivot pins 88 define over-center locking mechanism for locking the extensile arm 79 in a shortened position wherein the first section 85 and second section 86 are in side-by-side relation thus rotating the rearward frame 63 upwardly about the pivot pins 76 and 128 and raising the tool 2, or locking the extensile arm 79 in a lengthened position, wherein the first section 85 and the second section 86 are in elongate position thus rotating the rearward frame 63 downwardly about the pivot pins 76 and 128 and lowering the tool 2. The extensile arm 79 also allows raising and locking the tool 2 out of soil engagement by rotating the handle 91 counterclockwise, as seen in FIG. 2, or lowering and locking the tool 2 in the selected ground engagement position by reversing the process.

Several frame members 27 may be connected on a vehicle by engaging the connecting rod 132 in adjacent and coaxially aligned horizontal arms 54 as was previously discussed hereinabove. This interconnection of the frame members 27 provides added support and stability thereto.

It is to be understood that while certain forms of this invention have been illustrated and described it is not to be limited thereto except insofar as such limitations are included in the following claims.

Having thus described the invention, what is claimed and desired to secure by Letters Patent is:

1. A quick mounting mechanism for mounting a detachable tool support member on mobile agricultural equipment comprising:
(a) a frame member adapted for connection to said agricultural equipment;
(b) said frame member and said tool support member having a tool mounted orientation with respect to each other, wherein each has a surface in facing relationship to one another;
(c) at least one hooking assembly having a first part and a second part; said first part being attached to said frame member and said second part being attached to said tool support member, said first and second parts being engaged when said frame member and said tool support member are in said tool mounted orientation;
(d) a locking assembly having a first locking portion and a plurality of second locking portions; one of said second locking portions being associated with said frame member and spaced from said hooking assembly first part at a specified distance; another of said second locking portions being attached to said tool support member and spaced at a distance equal to said specified distance from said second hooking assembly part; said hooking assembly first and second parts being aligned and said locking assembly second portions being aligned when said frame member and said tool support member are in said tool mounted orientation; said hooking assembly parts and said locking assembly portions cooperating, each with one another upon placing said frame member and said tool support member in said tool mounted orientation, whereby said locking assembly first portion locks together said locking assembly second portions and cooperates with said hooking assembly to secure said tool support member to said frame member; and (e) securing means attached to and interbetween said agricultural equipment and said frame member, and wherein:

(1) said securing means comprises a member attached by one side thereof to said agricultural equipment and having a second side thereof with a vertically extending channel contained therein; said channel having a plurality of bolts slidably mounted therein and outwardly extending therefrom in a horizontal attitude; and (2) said frame member having a receiver thereon for each of said bolts; each said bolt being received in said receiver respectively whereby a selected height position is determined by sliding said bolts in said channel whereupon a fastener for each said bolt is used to lock each said bolt in said selected position; whereby gross height adjustment of said tool support member is provided.

2. A quick mounting mechanism for mounting a detachable tool support member on mobile agricultural equipment comprising:

(a) a frame member adapted for connection to said agricultural equipment;

(b) said frame member and said tool support member having a tool mounted orientation with respect to each other, wherein each has a surface in facing relationship to one another;

(c) at least one hooking assembly having a first part and a second part; said first part being attached to said frame member and said second part being attached to said tool support member, said first and second parts being engaged when said frame member and said tool support member are in said tool mounted orientation;

(d) a locking assembly having a first locking portion and a plurality of second locking portions; one of said second locking portions being associated with said frame member and spaced from said hooking assembly first part at a specified distance; another of said second locking portions being attached to said tool support member and spaced at a distance equal to said specified distance from said second hooking assembly part; said hooking assembly first and second parts being aligned and said locking assembly second portions being aligned when frame member and said tool support member are in said tool mounted orientation; said hooking assembly parts and said locking assembly portions cooperating, each with one another upon placing said frame member and said tool support member in said tool mounted orientation, whereby said locking assembly first portion locks together said locking assembly second portions and cooperates with said hooking assembly to secure said tool support member to said frame member;

(e) said tool support member including a first portion and a second portion said tool support member first portion is connected to and pivots on said tool support second portion along a horizontal axis; said tool support second portion has thereon said tool support surface abutting said frame member surface and said tool support first portion pivots on an opposite side of said tool support member second portion from said frame member surface; and an agricultural tool being attached to a free end of said tool support member first portion;

(f) extensile biasing means pivotally attached to and thrusting against both an upper end of said tool support member second portion and a medial point along said tool support member first portion; wherein said tool is biased downwardly about said horizontal axis; and (g) at least one pivoting assembly being spaced apart from each said hooking assembly and each said locking assembly; each said pivoting assembly having a first section and a second section; said first section being attached to said tool support member first portion and said second section being attached to said frame member, whereby said first and second sections are engaged when said frame member and said tool support member are in said tool mounted orientation; said first and second pivoting sections, said locking assembly second portions, and said first and second hooking parts are mirror imagedly aligned on said frame member and said tool support member respectively when said frame member and said tool support member are in said tool mounted orientation; whereby said hooking parts and said pivoting sections cooperate upon placing said frame member and said tool support member in said tool mounted orientation so as to be respectively engaged in one single insertion movement; and whereby said locking assembly, said hooking assembly, and said pivoting assembly cooperate to secure said frame member and said tool support member in said tool mounted orientation.

3. The mechanism according to claim 2, wherein:
(a) each said pivoting assembly comprises a pin and socket arrangement.

4. The mechanism according to claim 2, wherein:
(a) said pivoting assembly first section comprises a pin attached to said tool support member first portion and coaxially aligned with said horizontal axis; and
(b) said pivoting assembly second section comprises a pin receiver attached to said frame member; whereby said tool support member first portion radially pivots about said horizontal axis upon both said frame member and said tool support member second portion.

5. The mechanism according to claim 1, wherein:
(a) one said first hooking part is attached to said frame member; and
(b) one said second hooking part is attached to said tool support member; and including:
(c) a second hook being attached to said tool support member; and
(d) a second tube being attached to said frame member;
(e) said second hook and said second hooking part being spaced apart on said tool support member a distance equal to the distance said second tube is spaced apart from said first hooking part on said frame member; and
(f) a free end point of said first hooking point triangular segment pointing toward and in opposite direction to a free end point on a triangular segment of said second hook; whereby said second hook engages said second tube and said first hooking part engages said second hooking part in a single engaging motion.

6. A quick mounting mechanism for mounting a detachable tool support member on mobile agricultural equipment comprising:
 (a) a frame member adapted for connection to said agricultural equipment;
 (b) said frame member and said tool support member having a tool mounted orientation with respect to each other, wherein each has a surface in facing relationship to one another;
 (c) at least one hooking assembly having a first part and a second part; said first part being attached to said frame member and said second part being attached to said tool support member, said first and second parts being engaged when said frame member and said tool support member are in said tool mounted orientation;
 (d) a locking assembly having a first locking portion and a plurality of second locking portions; one of said second locking portions being associated with said frame member and spaced from said hooking assembly first part at a specified distance; another of said second locking portions being attached to said tool support member and spaced at a distance equal to said specified distance from said second hooking assembly part; said hooking assembly first and second parts being aligned and said locking assembly second portions being aligned when said frame member and said tool support member are in said tool mounted orientation; said hooking assembly parts and said locking assembly portions cooperating, each with one another upon placing said frame member and said tool support member in said tool mounted orientation, whereby said locking assembly first portion locks together said locking assembly second portions and cooperates with said hooking assembly to secure said tool support member to said frame member; and wherein:
 (e) each said first hooking part comprises a hook having a horizontal segment and a vertically extending triangular segment attached at the base thereof to a free end of said horizontal segment; and
 (f) each said second hooking part comprises a tube; said tube receiving said triangular segment therein when said frame member and tool support member are in said tool mounted orientation; said base of said triangular segment being substantially of equal width to an interior width of said tube, whereby said base and said tube interior are pressed together and restrict relative sidewise motion thereof.

7. In a quick mounting mechanism for detachably mounting a tool support member on mobile agricultural equipment, the improvement comprising:
 (a) a frame member adapted for connection to said agricultural equipment;
 (b) each of said frame member and said tool support member having a respective surface thereof, said surfaces being in mutually facing relation in a tool mounted orientation of said tool support member;
 (c) at least one hooking assembly including a hook positioned on one of said frame member and said tool support member and a hook receiver on the other, said hook including a segment projecting in a plane spaced from and substantially parallel to said surface of the respective member on which said hook is positioned, said hook segment engaging said hook receiver when said tool support member is in said tool mounted orientation;
 (d) a locking assembly including a lock receiver on each of said frame member and said tool support member and a lock member; the lock receivers being spaced respectively from said hook and hook receiver, and being aligned and receiving said lock member when said tool support member is in said tool mounted orientation; and said locking assembly cooperating with said hooking assembly to secure said tool support member on said frame member; and wherein
 (e) said tool support member includes a mounting portion and a tool receiving portion, said tool receiving portion having a pivotal connection to said mounting portion whereby said tool receiving portion pivots about a horizontal axis in said tool mounted orientation of said tool support member; and including:
 (f) pivot means on said frame member and said tool receiving portion, said pivot means cooperating with said pivotal connection to allow pivotal movement of said tool receiving portion about said horizontal axis and cooperating with said hooking assembly and said locking assembly to secure said tool support member on said frame member, and said pivot means being separable for detaching said tool support member from said frame member.

8. The mechanism according to claim 7, wherein said pivot means includes:
 (a) a pivot pin positioned coaxially with said horizontal axis and mounted on one of said frame member and said tool support member mounting portion; and
 (b) a pivot socket positioned on the other of said frame member and said mounting portion to receive said pivot pin.

9. The mechanism according to claim 7, including: extensile biasing means pivotally attached between said mounting portion of said tool support member and said tool receiving portion thereof, said biasing means urging an agricultural tool mounted on said tool receiving portion downward about said horizontal axis.

10. In a quick mounting mechanism for detachably mounting a tool support member on mobile agricultural equipment, the improvement comprising:
 (a) a frame member adapted for connection to said agricultural equipment;
 (b) each of said frame member and said tool support member having a respective surface thereof, said surfaces being in mutually facing relation in a tool mounted orientation of said tool support member;
 (c) at least one hooking assembly including a hook positioned on one of said frame member and said tool support member and a hook receiver on the other, said hook including a segment projecting in a plane spaced from and substantially parallel to said surface of the respective member on which said hook is positioned, said hook segment engaging said hook receiver when said tool support member is in said tool mounted orientation;
 (d) a locking assembly including a lock receiver on each of said frame member and said tool support member and a lock member; the lock receivers being spaced respectively from said hook and hook receiver, and being aligned and receiving said lock member when said tool support member is in said tool mounted orientation; and said locking assembly cooperating with said hooking assembly to secure said tool support member on said frame member; and (e) securing means attaching said frame member to said agricultural equipment, said securing means including:
  (1) a securing member having one side thereof attached to said agricultural equipment and a vertical channel extending on an opposite side thereof;
  (2) at least one bolt slidably retained in said channel;
  (3) said frame member having a bolt receiving aperture formed therethrough; and
  (4) said frame member being attached to said securing member by reception of said bolt through said aperture and by removable fastening of same therein, whereby gross height adjustment of said tool support member is provided.

11. In a quick mounting mechanism for detachably mounting a tool support member on mobile agricultural equipment, the improvement comprising:

(a) a frame member adapted for connection to said agricultural equipment;

(b) each of said frame member and said tool support member having a respective surface thereof, said surfaces being in mutually facing relation in a tool mounted orientation of said tool support member;

(c) an upper hooking assembly including a hook positioned on one of said frame member and said tool support member and a hook receiver on the other, said hook including a segment projecting in a plane spaced from and substantially parallel to said surface of the respective member on which said hook is positioned, said hook segment engaging said hook receiver when said tool support member is in said tool mounted orientation;

(d) a locking assembly including a lock receiver on each of said frame member and said tool support member and a lock member; the lock receivers being spaced respectively from said hook and hook receiver, and being aligned and receiving said lock member when said tool support member is in said tool mounted orientation; and said locking assembly cooperating with said upper hooking assembly to secure said tool support member on said frame member;

(e) a lower hooking assembly similar to and spaced below said upper hooking assembly; and (f) said upper and lower hooking assemblies cooperating whereby the respective hooks and hook receivers thereof are engaged in substantially a single engaging motion, and cooperating with said locking assembly whereby said lock receivers are aligned and said tool support member is positioned in said tool mounted orientation upon said respective hooks and hook receivers being engaged; and wherein (g) the hook of said upper hooking assembly is mounted on said tool support member and includes a vertical downwardly projecting segment spaced from and parallel to said tool support member surface;

(h) the hook receiver of said upper hooking assembly includes an upwardly open tubular member on said frame member sized to receive said hook of said upper hooking assembly;

(i) the hook of said lower hooking assembly is mounted on said frame member and includes a vertical upwardly projecting segment spaced from and parallel to said frame member surface; and (j) the hook receiver of said lower hooking assembly includes a downwardly open, substantially tubular member on said tool support member sized to receive said hook of said lower hooking assembly.

* * * * *